United States Patent [19]
Spielberger

[11] 3,742,231
[45] June 26, 1973

[54] THERMISTOR BOLOMETER HAVING A BUILT-IN SOURCE

[75] Inventor: Seymour C. Spielberger, North Hempstead, N.Y.

[73] Assignee: Barnes Engineering Company, Stamford, Conn.

[22] Filed: Jan. 7, 1971

[21] Appl. No.: 104,717

[52] U.S. Cl............................250/338, 73/355 R
[51] Int. Cl................................................G01j 5/02
[58] Field of Search.................... 250/83.3 H, 83 R, 250/211 J; 323/75 H; 73/355 R

[56] References Cited
UNITED STATES PATENTS

| | | | |
|---|---|---|---|
| 3,397,314 | 8/1968 | Weiner | 250/83.3 H X |
| 3,246,159 | 4/1966 | Pankove | 250/83.3 H X |
| 3,304,431 | 2/1967 | Biard et al. | 250/211 J X |
| 3,539,803 | 11/1970 | Beerman | 250/83.3 H X |

Primary Examiner—Archie R. Borchelt
Attorney—Joseph Levinson and Robert Ames Norton

[57] ABSTRACT

A thermistor bolometer having a bolometer housing is provided with an active thermistor flake mounted in the housing for providing a means of measuring radiation applied thereto. A light-emitting diode is mounted in the housing for applying radiation directly on the back of the active flake. The light-emitting diode provides a fully controllable source of radiant energy which may be utilized to test, calibrate, or function with the detector and the system in which the detector is employed in a variety of programmed ways. The thermistor bolometer may be of the immersed type, in which the active flake is mounted on an infrared window or lens, or may be of the solid-backed variety in which the solid-back substrate is transparent to the radiation applied to the back of the active flake by the light-emitting diode.

6 Claims, 3 Drawing Figures

PATENTED JUN 26 1973

3,742,231

INVENTOR.
SEYMOUR C. SPIELBERGER
BY Joseph Levinson

THERMISTOR BOLOMETER HAVING A BUILT-IN SOURCE

BACKGROUND OF THE INVENTION

Thermistors are thermally sensitive resistors having large changes in resistance with temperature. When employed as infrared radiation detectors, thermistor elements are made small, thin, and are attached to good heat sinks to induce a fast response. These are known as solid-backed termistor infrared detectors or thermistor bolometers. The detectivity of thermistor bolometers increases with decreasing receiver area. Since there are practical limits to the optical gain which can be achieved with conventional optical systems in the infrared, detectivity increases have been achieved by immersing the detector flake on infrared windows and lenses. This type of thermistor bolometer, in which the window or lens is also a heat sink for the detector, is called an immersed thermistor bolometer, in which the thermistor flake acts optically as though it were a part of the lens.

When bolometers such as those described are utilized in infrared systems, such as radiometers, aerial or satellite scanners, and other types of infrared radiation gathering and measuring instrumentation, the procedure for checking out the detectors and the rest of the system are not simple tasks. It is usually a difficult and expensive matter to provide precise optical test stimulus for such infrared equipment without using complicated and expensive calibration sources and simulators. This is particularly true where conditions of alignment, collimation, and spectral response with respect to the test soruce must be satisfied. Since the bolometers are the final measuring device in sometimes complex optical systems, reliable detector measurements after final assembly of the detectors because of the immersion lenses and other optical elements in the infrared equipment, are a complicated, and sometimes almost impossible, operation.

In many radiometric applications, the detector alternately views a heated reference cavity, referred to as a black body, and the object whose temperature is to be measured. The provision of such a source substantially increases the bulk, power requirements, and costs of such instruments. The same difficulty resides in those small-type instruments in which a known source is used which is made equivalent to an unknown source with the temperature measurement being made by measuring the input power to the known source.

Another difficulty encountered in infrared instrumentation is to provide a system with a wide range signal resolving capability. If the measurement is to be made in a situation where the measured source's energy is large, with the differential between the background and measured source being large, it is frequently difficult to design an amplifier for the detector which accommodates a large dynamic range which can still resolve small changes in temperature.

SUMMARY OF THE INVENTION

Accordingly, it is an object of the present invention to provide thermistor bolometers which overcome the aforesaid difficulties.

A further object of this invention is to provide thermistor bolometers having a built-in source which is relatively simple and easy to install.

Another object of this invention is to provide thermistor bolometers with a built-in source which is easily controllable and which does not degrade bolometer performance.

Still a further object of this invention is to provide a thermistor bolometer which eliminates the need for external black body reference sources in certain applications.

Another object of this invention is to provide a thermistor bolometer which can be used in instruments for permitting higher resolution for small temperature changes when the measured energy varies over a wide range.

In carrying out this invention in one illustrative embodiment thereof, an active thermistor flake, which is either immersed or on a solid-back substrate, is irradiated on the back side of the flake with a controllable source which is incorporated in the bolometer housing.

DESCRIPTION OF THE PREFERRED EMBODIMENTS

Figure 1:
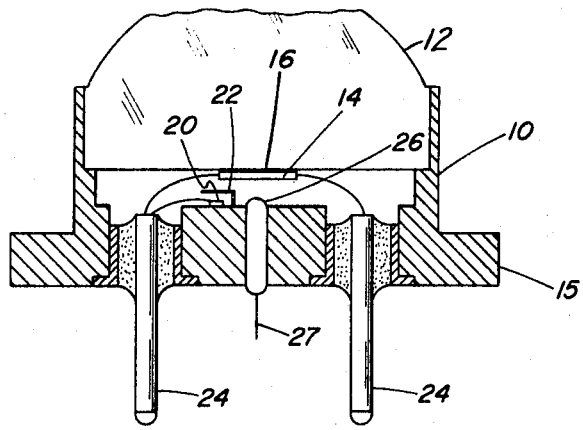
FIG. 1 is a cross-sectional view of an illustrative embodiment of an immersed thermistor bolometer in accordance with the present invention.

Referring now to FIG. 1, a thermistor bolometer is provided with a bolometer housing 10 having a base 15. Mounted in the top of the housing 10 is an infrared window in the form of an immersion lens 12 having an active thermistor flake 14 immersed thereon by an immersion layer 16. The immersion layer 16 may be in the form of a selenium glass or any other suitable material. A compensating flake 20 is mounted on the base 15 and shielded from radiation applied to the bolometer by a shield 22. The compensating flake 20 will generally be mounted on the base 15 via an insulating layer of plastic material, such as polyglycol terephthalate. Feedthrough pins 24 are also mounted in the base 15 of the bolometer housing 10, and suitable connections to the thermistor flakes 14 and 20 are made to the pins 24. In accordance with the present invention, a light-emitting diode (LED) 26 having leads 27 connected thereto is mounted in the base in a manner for suitably irradiating the under side of the active flake 14 to provide the self-test capability which will be explained in connection with FIG. 2. Although not limited thereto, a General Electric type SS1-15-LED is illustrative of one suitable form of light-emitting diode.

Figure 2:
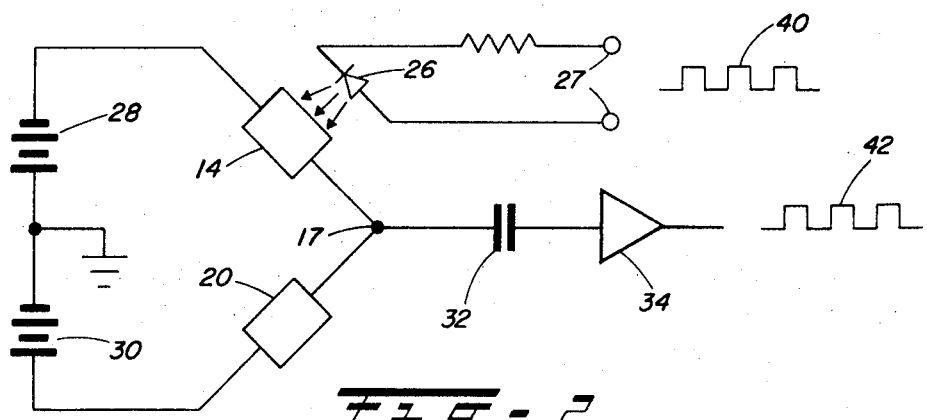
FIG. 2 is a schematic diagram of the conventional bridge circuit configuration of the thermistor bolometer illustrating schematically one form of operation of the present invention.

As will be seen in FIG. 2, the active thermistor flake 14 and the compensating thermistor flake 20 are connected in a bridge circuit. Equal voltages of opposite polarity from the sources 28 and 30 are applied to the two identical thermistor elements 14 and 20, thus maintaining the signal junction 17 near D.C. ground potential regardless of the variations in ambient temperature. Since the temperature of the compensating thermistor 20 is shielded from radiation, it maintains the same mean temperature as the active thermistor flake 14. When the active thermistor 14 is exposed to chopped or modulated radiation, the active thermistor flake 14 produces an A.C. voltage at the junction 17, which is coupled via a blocking capacitor 32 to an amplifier 34. As illustrated in FIG. 2, the A.C. voltage output of the detector bridge circuit can be simulated by the use of the light-emitting diode 26 which may be driven from terminals 27 by a suitable signal 40. When a signal such as 40 is applied to the light-emitting diode, a resulting signal 42 appears at the output of the amplifier 34. Signals such as 40 may be applied to the output terminals of the LED 26 by a function generator or any other suitable source.

The light-emitting diode is particularly useful in the present application because it is hermetically sealed and therefore will not contaminate the thermistor bolometer. Furthermore, the light-emitting diode requires very little power and emits radiant energy with high efficiency, thereby not increasing the ambient temperature of the detector. In addition, the light-emitting diode can be modulated readily over a relatively wide frequency range, providing some latitude in its simulation capabilities. Since the light-emitting diode is only optically coupled to the thermistor bolometer, the detector reliability will not be affected.

Figure 3:
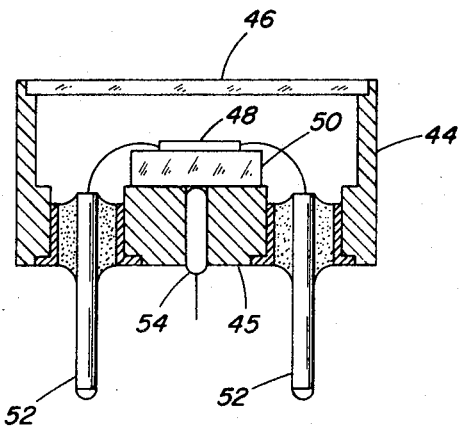
FIG. 3 is a cross-sectional view of an illustrative embodiment of a solid-backed thermistor bolometer in accordance with this invention.

Although the invention's greatest applicability would probably reside in the immersed bolometer construction, it also has application to other bolometer constructions, such as the solid-backed thermistor bolometer. In the solid-backed construction, as illustrated in FIG. 3, the bolometer includes a housing 44 having an infrared window 46 mounted on the top thereof. An active thermistor flake 48 is cemented to a backing block, usually of a dielectric material with good heat conductivity. The backing block 50 in turn is cemented or otherwise attached to a larger metal base 45 of the housing 44. Connections from the thermistor flake 48 are made to the feed-through pins 52 in the base 45 of the housing 44. The compensating flake for the solid-backed detector is not shown for ease of illustration in FIG. 3. As was the case of FIG. 1, a light-emitting diode 54 is mounted in the base 45 of the bolometer housing 44. The backing block 50 must be of a material which is transparent to the radiation emitted by the light-emitting diode 54, which would include such materials as glass, sapphire, and quartz, which are commonly used in solid-backed detectors. Accordingly, the radiation applied from the light-emitting diode 54 would pass through the substrate or backing block 50 to the under side of the active flake 48, which would provide a similar technique to that illustrated in connection with FIGS. 1 and 2.

An alternative structure to that shown in FIGS. 1 and 3 would be to provide, in place of the light-emitting diode, a fiber optic which could be coupled to a light-emitting diode or similar type source. The positioning of the light-emitting diode or fiber optic is shown centrally in the figures, but is not necessarily restricted to that location. All that is necessary is that the under side of the flake be irradiated for the simulation desired.

Utilizing the present invention of incorporating a source in the detector structure per se, facilitates a simple, economical self-test capability for complex infrared equipment in which the detector is employed, such as horizon sensors. Such detectors can be readily checked without the use of external optics or expensive calibrated sources. Furthermore, specific infrared system characteristics, such as response to solar energy levels and frequency response, are parameters which are difficult to test in a laboratory. The light-emitting diode augmented thermistor bolometer can be pulsed to enable simple tests of such parameters.

In many radiometers employing thermistor bolometer detectors, the detector alternately views the source to be measured and a heated reference cavity called a black body source. Such a radiometer could use the present invention and do away with the reference cavity, thereby reducing the cost of the instrument. The LED would be pulsed when the detector is supposed to be viewing the reference cavity to simulate the same result. Considerably less power is required for the LED than the conventional reference source. Also, in null type instruments, where the energy output from an unknown source is measured by balancing it with that from a known source and measuring the power input of the known source, the LED augmented thermistor of the present invention would be useful.

The thermistor bolometer of this invention could also be applied in the applications where the detector has a large dynamic range but an amplifier would be difficult to design which would cover the range and still be able to resolve small changes in temperature. This occurs where the differential is large between the energy to be measured and the background level. The LED of the present invention could be powered at suitable higher background level of radiance. Since the measuring output of the thermistor detector is the difference between background and signal radiances, the dynamic gain range of the amplifier can be considerably reduced. This permits higher resolution of small temperature differentials in the object or field of view which is being measured.

Since other modifications and changes, varied to fit particular operating requirements and environments, will be apparent to those skilled in the art, the invention is not considered limited to the examples chosen for purposes of illustration, and covers all changes and modifications which do not constitute departures from the true spirit and scope of this invention.

I claim:
1. A thermistor bolometer having a built-in source comprising
   a. a bolometer housing,
   b. an active thermistor flake mounted in said housing for measuring radiation applied thereto, and
   c. a built-in source means integrally mounted in said housing for applying a controllable amount of radiation directly on the back of said active flake which measures said controllable amount of radiation and thereby simulates a variety of conditions internally without resort to additional external structure.

2. The thermistor bolometer set forth in claim 1 wherein an immersion lens is mounted in said housing with said active flake being immersed on the under side of said lens in said housing.

3. The thermistor bolometer set forth in claim 1 wherein said source means comprises a light-emitting diode.

4. The thermistor bolometer set forth in claim 2 wherein said source means comprises a light-emitting diode.

5. The thermistor bolometer set forth in claim 1 having said active thermistor flake mounted on a solid substrate of material transparent to radiation applied through said substrate by said source means.

6. The thermistor bolometer set forth in claim 5 wherein said source means comprises a light-emitting diode.

* * * * *